(12) United States Patent
Yamamoto et al.

(10) Patent No.: US 6,721,827 B2
(45) Date of Patent: Apr. 13, 2004

(54) DATA PROCESSING APPARATUS AND DATA PROCESSING METHOD

(75) Inventors: Takehiro Yamamoto, Yokohama (JP); Takao Inoue, Tokyo (JP)

(73) Assignee: Ando Electric Co., Ltd., Tokyo (JP)

( * ) Notice: Subject to any disclaimer, the term of this patent is extended or adjusted under 35 U.S.C. 154(b) by 208 days.

(21) Appl. No.: 09/983,736

(22) Filed: Oct. 25, 2001

(65) Prior Publication Data

US 2002/0052989 A1 May 2, 2002

(30) Foreign Application Priority Data

Oct. 31, 2000 (JP) ........................................ 2000-333089

(51) Int. Cl.[7] .................. G06F 3/00; G06F 13/12; H04J 3/06
(52) U.S. Cl. .................. 710/61; 710/71; 370/509; 370/512
(58) Field of Search ............... 710/71, 61, 52, 710/1, 30, 3, 4; 370/512, 352, 392, 503, 509; 375/354

(56) References Cited

U.S. PATENT DOCUMENTS 5,577,037 A * 11/1996 Takatori et al. .......... 370/395.7
5,898,887 A * 4/1999 Hansen .......................... 710/1
6,385,213 B1 * 5/2002 Nakamura et al. .......... 370/513
6,560,219 B1 * 5/2003 Tabu et al. ................. 370/352

* cited by examiner

*Primary Examiner*—Kim Huynh
(74) *Attorney, Agent, or Firm*—Oliff & Berridge, PLC

(57) ABSTRACT

A data processing apparatus and a data processing method easily realizable of a transparent processing of a high-speed serial data. The data processing apparatus (1) including a serial data conversion section for converting serial data to predetermined set of parallel data; a transparent data information detection section (10) for detecting information concerning transparent data, from the parallel data; an effective byte number operation section for operating an effective byte number of the parallel data; a transparent data conversion section (20) for converting transparent data of the parallel data, and moving predetermined data after the transparent data forward, in the parallel data; an address control section (304) for determining addresses at which the parallel data are rearranged; and a data array section (30) for moving predetermined data to one predetermined set of parallel data from another predetermined set of parallel data.

12 Claims, 11 Drawing Sheets

EFFECTIVE BYTE NUMBER

FIG.9

|  | SEL1 | SEL2 | SEL3 | SEL4 | SEL5 | SEL6 | SEL7 | SEL8 |
|---|---|---|---|---|---|---|---|---|
| SW3INT_1 | DEC1 | DEC16 | DEC15 | DEC14 | DEC13 | DEC12 | DEC11 | DEC10 |
| SW3INT_2 | DEC2 | DEC1 | DEC16 | DEC15 | DEC14 | DEC13 | DEC12 | DEC11 |
| SW3INT_3 | DEC3 | DEC2 | DEC1 | DEC16 | DEC15 | DEC14 | DEC13 | DEC12 |
| SW3INT_4 | DEC4 | DEC3 | DEC2 | DEC1 | DEC16 | DEC15 | DEC14 | DEC13 |
| SW3INT_5 | DEC5 | DEC4 | DEC3 | DEC2 | DEC1 | DEC16 | DEC15 | DEC14 |
| SW3INT_6 | DEC6 | DEC5 | DEC4 | DEC3 | DEC2 | DEC1 | DEC16 | DEC15 |
| SW3INT_7 | DEC7 | DEC6 | DEC5 | DEC4 | DEC3 | DEC2 | DEC1 | DEC16 |
| SW3INT_8 | DEC8 | DEC7 | DEC6 | DEC5 | DEC4 | DEC3 | DEC2 | DEC1 |
| SW3INT_9 | DEC9 | DEC8 | DEC7 | DEC6 | DEC5 | DEC4 | DEC3 | DEC2 |
| SW3INT_10 | DEC10 | DEC9 | DEC8 | DEC7 | DEC6 | DEC5 | DEC4 | DEC3 |
| SW3INT_11 | DEC11 | DEC10 | DEC9 | DEC8 | DEC7 | DEC6 | DEC5 | DEC4 |
| SW3INT_12 | DEC12 | DEC11 | DEC10 | DEC9 | DEC8 | DEC7 | DEC6 | DEC5 |
| SW3INT_13 | DEC13 | DEC12 | DEC11 | DEC10 | DEC9 | DEC8 | DEC7 | DEC6 |
| SW3INT_14 | DEC14 | DEC13 | DEC12 | DEC11 | DEC10 | DEC9 | DEC8 | DEC7 |
| SW3INT_15 | DEC15 | DEC14 | DEC13 | DEC12 | DEC11 | DEC10 | DEC9 | DEC8 |
| SW3INT_16 | DEC16 | DEC15 | DEC14 | DEC13 | DEC12 | DEC11 | DEC10 | DEC9 |

DATA PROCESSING APPARATUS AND DATA PROCESSING METHOD

BACKGROUND OF THE INVENTION

1. Field of the Invention

The present invention relates to a data processing apparatus and a data processing method, for use in a high-speed serial communication.

2. Description of Related Art

One of world standards for optical transmission networks realizable of high-speed data communications is a SDH (Synchronous Digital Hierarchy). According to the SDH, a synchronous transfer module called a STM is provided as a data multiplexing unit. A STM-1 (Synchronous Transfer Module Level One) is a standard of the STM, and a bit rate of the STM-1 is 155.52 Mb/s.

The STM-1 has a frame consisting of a two-dimensional byte array of 9 columns by 270 rows. Head array of 9 columns by 9 rows of the two-dimensional byte array is called a section overhead, which will be called SOH, in the following. Array of 9 columns by 261 rows following the SOH, is called a payload. The SOH is a control part storing a frame synchronous signal, a maintenance information or the like, added to the payload, therein. The payload is a part storing multiplexed actual data therein.

According to the STM, because one frame is transmitted for every 125 microseconds, a bit rate is determined according as how many bytes one column by one row of data consists of. For example, according to the STM-1, because one column by one row of data consists of one byte, the bit rata is determined on 155.52 Mbps on the basis of the equation; 9 (columns)×270 (bytes)×(1/125 microseconds)= 155.52. In the SDH, a STM-4 having four times as high a bit rata as the STM-1, wherein one column by one row of data consists of four bytes, a STM-16 having sixteen times as high a bit rata as the STM-1, wherein one column by one row of data consists of sixteen bytes, and so on are standardized.

Further, according to the STM, one frame is further partitioned into a plurality of time slots, for example, channels. Therefore, original data, that are user data or the like transmitted and received, are stored in each time slot, and thereby, a plurality of data are multiplexed. These multiplexed data are transmitted as serial data, through the SDH communication network.

In the data transmitted through the SDH communication network, predetermined data, for example, idle data, for indicating a data break or the like in the STM, are inserted. In order to distinguish the original data having the same code as a code of the idle data from the idle data, a predetermined data conversion is performed to the original data. Therefore, at the data receiving side, it is necessary to perform a transparent processing such that data converted at the data transmitting side is reconverted to the original data.

The transparent processing is a processing of parallel converting serial data received at the receiving side of the SDH communication network, to the parallel data, for every 8 bits, in order, and of converting (reconverting) the predetermined data that is transparent data converted at the transmitting side, of the parallel data, to the original data.

FIG. 12 is a schematic block diagram for showing a transparent processing according to an earlier development.

As shown in FIG. 12, serial data received at the data processing apparatus 100 are inputted to a transparent data detection unit 110 of the data processing apparatus 100. Then, the transparent data detection unit 110 detects information on transparent data of the received serial data, for example, an address or the like of transparent data, and transmits the received serial data and the detected information on transparent data to a transparent data conversion unit 120. The transparent data conversion unit 120 converts transparent data of the received serial data to predetermined original data on the basis of the detected information on transparent data.

When the transparent processing is carried out, and the transparent data are converted to the original data, the latter half byte of the detected transparent data is extracted from the detected transparent data. Thereby, idle data of bytes corresponding to the number of the transparent data are generated. Therefore, it is necessary to operate the data number that is the effective byte number, of one block that is one parallel data block, after the transparent data are converted, according to the data sequence, and to rearrange the effective data of the block on the basis of the effective byte number.

More specifically, in case the transparent processing is performed in the STM-16, when data are inputted for every four bytes at parallel to the transparent data detection unit, the transparent data detection unit detects transparent data in the inputted data. Then, the transparent data sampling unit samples the transparent data from the inputted data. Thereafter, the transparent data sampling unit moves data corresponding to the number of the transparent data sampled, forward, for every four bytes, and operates the effect byte number of the data sequence. The transparent data sampling unit outputs the data from which the transparent data have been sampled and the information on the effect byte number, to the transparent data array unit.

The transparent data array unit further moves the data to the part of the idle byte data, forward, on the basis of the data from which the transparent data have been sampled and the information on the effect byte number, to reconstruct the parallel data. Because the idle data stream occurs every when the data are moved forward, the data from which the transparent data are sampled, are shifted by a flip-flop (F/F), and a data is extracted from the shifted data to interpolate the idle data stream. In case the transparent processing is carried out to the data for every four bytes, in order to generate effect data for every four bytes, three shifted data is generated by the flip-flop (F/F), and the data is extracted from the three shifted data according to a selection signal.

On the other hand, with the increase of the communication data quantity, the utilization of a high-speed data communication on the basis of a STM-64 is increasing. Although a device drivable at 10 GHz is necessary for the high-speed data communication such as the STM-64, such a device does is not provided at present. As a result, considering the realization of the high-speed data communication by an existing FPGA (Field Programmable Gate Array), the data are processed for every 16 bytes at 78 MHz, at parallel.

However, because the transparent data sampling unit moves data of 16 byte parallel data, forward, there has been a problem that the transparent data sampling unit cannot processes the data at 78 MHz in the FPGA, by performing the same processing to the data as that to the 4 byte parallel data.

Further, in case the transparent data array unit rearranges the parallel data, in order to generate the effect data for every 16 byte parallel data, it is necessary that the F/F generates fifteen data and extracts the effect data from the fifteen generated data on the basis of the selection signal. Accordingly, there have been problems that the circuit scale is enlarged and the outputted selection signal becomes complex.

SUMMARY OF THE INVENTION

The present invention was developed in order to solve the problems as mentioned above.

An object of the present invention is to provide a data processing apparatus and a data processing method easily realizable of a transparent processing of a high-speed serial data on the basis of a STM or the like.

In accordance with a first aspect of the present invention, a data processing apparatus (for example, a data processing apparatus 1 shown in FIG. 1) for use in a high-speed serial data communication, comprises: a serial data conversion section (for example, an interface which is provided at an input terminal of the data processing apparatus 1 and which is not shown in figures) for receiving high-speed serial data, and converting the high-speed serial data to first predetermined set of parallel data; a transparent data information detection section (for example, a transparent data detection unit 10 shown in FIG. 1) for detecting information concerning transparent data, from the first predetermined set of parallel data; an effective byte number operation section (for example, adders 202_1, 202_2 and 204 shown in FIG. 2) for operating an effective byte number of the first predetermined set of parallel data, on the basis of the information concerning transparent data; a transparent data conversion section (for example, a transparent data sampling unit 20 shown in FIG. 1) for converting transparent data of the first predetermined set of parallel data, and moving predetermined data after the transparent data forward, in the first predetermined set of parallel data, to arrange the first predetermined set of parallel data, on the basis of the information concerning transparent data and the effective byte number; an address control section (for example, a pointer 304 shown in FIG. 7) for determining addresses at which the first predetermined set of parallel data arranged by the transparent data conversion section are rearranged, on the basis of the effective byte number; and a data array section (for example, a transparent data array unit 30 shown in FIG. 1) for moving predetermined data to one first predetermined set of parallel data from another first predetermined set of parallel data following the one first predetermined set of parallel data, to rearrange the first predetermined set of parallel data at the addresses, on the basis of the effective byte number and the addresses.

Herein, the first predetermined set of parallel data means parallel data generated by partitioning the serial data into a first predetermined number, and inputted from the serial data conversion section to the transparent data information detection section at the substantially same time. Further, the effective byte number means a byte number of effective data of the first predetermined set of parallel data. Furthermore, the transparent data is data converted to a predetermined data at a data transmitting side, in order to distinguish original data having the same code as that of idle data from idle data.

Further, the function that the transparent data conversion section moves predetermined data after the transparent data forward, in the first predetermined set of parallel data means to move predetermined data following the transparent data, corresponding to the number of the transparent data included in the first predetermined set of parallel data, to fill idle data generated by converting the transparent data, with the predetermined data as effective data. Furthermore, the function that the data array section moves predetermined data to one first predetermined set of parallel data from another first predetermined set of parallel data means to move predetermined data of the latter first predetermined set of parallel data, corresponding to the number of the transparent data included in the former first predetermined set of parallel data, to fill the former first predetermined set of parallel data with effective data.

In accordance with a second aspect of the present invention, a data processing method of data in a high-speed serial data communication, comprises the steps of: receiving high-speed serial data, and converting the high-speed serial data to first predetermined set of parallel data; detecting information concerning transparent data, from the first predetermined set of parallel data; operating an effective byte number of the first predetermined set of parallel data, on the basis of the information concerning transparent data; converting transparent data of the first predetermined set of parallel data, and moving predetermined data after the transparent data forward, in the first predetermined set of parallel data, to arrange the first predetermined set of parallel data, on the basis of the information concerning transparent data and the effective byte number; determining addresses at which the first predetermined set of parallel data arranged are rearranged, on the basis of the effective byte number; and moving predetermined data to one first predetermined set of parallel data from another first predetermined set of parallel data following the one first predetermined set of parallel data, to rearrange the first predetermined set of parallel data at the addresses, on the basis of the effective byte number and the addresses.

According to the data processing apparatus or the data processing method of the first or second aspect of the present invention, because the received serial data are converted to the first predetermined set of parallel data, and the first predetermined set of parallel data are processed on the basis of the detected information concerning transparent data, it is possible to easily perform the transparent processing only by a relatively low-speed conventional device.

Preferably, in the data processing apparatus according to the first aspect of the present invention, the transparent data information detection section comprises a storage section for storing one first predetermined set of parallel data converted by the serial data conversion section therein, and detects the information concerning transparent data from data at a last address of the one first predetermined set of parallel data stored in the storage section and data at a top address of another first predetermined set of parallel data converted following the one first predetermined set of parallel data.

Preferably, the data processing method according to the second aspect of the present invention, further comprises the steps of: storing one first predetermined set of parallel data converted in a storage section; and detecting the information concerning transparent data from data at a last address of the one first predetermined set of parallel data stored in the storage section and data at a top address of another first predetermined set of parallel data converted following the one first predetermined set of parallel data.

According to the data processing apparatus or the data processing method as described above, if the transparent data are partitioned into two first predetermined set of parallel data when the received serial data are converted to the first predetermined set of parallel data, because the information concerning transparent data bridging two first predetermined set of parallel data can be detected, it is possible to perform the transparent processing without leaving the transparent data in the first predetermined set of parallel data.

Preferably, in the data processing apparatus according to the first aspect of the present invention, the transparent data information detection section comprises: a transparent data detection section for detecting an address and a number of transparent data included in the first predetermined set of parallel data converted by the serial data conversion section; and a transparent data information transmission section for transmitting the address and the number of transparent data detected by the transparent data detection section, as the information concerning transparent data, to the effective byte number operation section.

Preferably, the data processing method according to the second aspect of the present invention, further comprises the steps of: detecting an address and a number of transparent data included in the first predetermined set of parallel data converted; and transmitting the address and the number of transparent data detected, as the information concerning transparent data.

According to the data processing apparatus or the data processing method as described above, because it is possible to determine a number of effective data included in each first predetermined set of parallel data, after the transparent processing, it is possible to easily understand a data structure of each first predetermined set of parallel data.

Preferably, in the processing apparatus according to the first aspect of the present invention, the transparent data conversion section comprises: a plurality of transparent processing sections (for example, 4 byte processing blocks 201_1 to 201_4 shown in FIG. 2) for converting transparent data of the first predetermined set of parallel data to original data, for every second predetermined set of parallel data, on the basis of the information concerning transparent data detected by the transparent data information detection section; and a plurality of data moving sections (for example, a SW1_1, a SW1_2 and a SW2 shown in FIG. 2) for moving predetermined data after the transparent data forward, in the second predetermined set of parallel data, on the basis of the effective byte number operated by the effective byte number operation section.

Herein, the second predetermined set of parallel data is one of a plurality of sets of parallel data into which the first predetermined set of parallel data are partitioned. Therefore, the data unit of the second predetermined set of parallel data is smaller than that of the first predetermined set of parallel data.

Preferably, the data processing method according to the second aspect of the present invention, further comprises the steps of: converting transparent data of the first predetermined set of parallel data to original data, for every second predetermined set of parallel data, on the basis of the information concerning transparent data; and moving predetermined data after the transparent data forward, in the second predetermined set of parallel data, on the basis of the effective byte number.

According to the data processing apparatus or the data processing method as described above, the first predetermined set of parallel data can be generated by converting the transparent data for every the second predetermined set of parallel data, and performing the transparent processing to the second predetermined set of parallel data at a plurality of steps. Consequently, because the processing data unit can be reduced, it is possible to arrange parallel data without reducing the processing speed.

Preferably, in the data processing apparatus according to the first aspect of the present invention, the data array section comprises: a data reading out section (for example, a selector 306 shown in FIG. 7) for reading out a third predetermined set of parallel data from the first predetermined set of parallel data every when the third predetermined set of parallel data are rearranged at the predetermined addresses by moving the predetermined data to the one first predetermined set of parallel data from the another first predetermined set of parallel data, on the basis of the effective byte number and the addresses; and a read out timing control section (for example, a controller 307 shown in FIG. 7) for controlling a timing at which the data reading out section reads out the third predetermined set of parallel data, on the basis of the effective byte number and the addresses.

Herein, the third predetermined set of parallel data is one of a plurality of sets of parallel data into which the first predetermined set of parallel data are partitioned. Therefore, the data unit of the third predetermined set of parallel data is smaller than that of the first predetermined set of parallel data.

Preferably, the data processing method according to the second aspect of the present invention, further comprises the steps: reading out a third predetermined set of parallel data from the first predetermined set of parallel data every when the third predetermined set of parallel data are rearranged at the predetermined addresses by moving the predetermined data to the one first predetermined set of parallel data from the another first predetermined set of parallel data, on the basis of the effective byte number and the addresses; and controlling a timing at which the third predetermined set of parallel data is read out, on the basis of the effective byte number and the addresses.

According to the data processing apparatus or the data processing method as described above, it is possible to rearrange parallel data according to a simple signal, only by using a relatively low-speed conventional device, without enlarging a size of a processing circuit.

In accordance with a third aspect of the present invention, a data processing apparatus (for example, a data processing apparatus 1 shown in FIG. 1) for use in a high-speed serial data communication, comprises: an interface section for converting high-speed serial data to 16 byte parallel data; a transparent data detection unit (for example, a transparent data detection unit 10 shown in FIG. 1) for detecting information on transparent data from the 16 byte parallel data; four processing blocks (for example, 4 byte processing blocks 201_1 to 201_4 shown in FIG. 2) for converting transparent data and operating an effective byte number, of the 16 byte parallel data, for every 4 byte parallel data, on the basis of the information on transparent data; two first switches (for example, a SW1_1 and a SW1_2 shown in FIG. 2) each of which moves effective data to one 4 byte parallel data from another 4 byte parallel data following the one 4 byte parallel data, to arrange 8 byte parallel data, on the information on transparent data and the effective byte number; a second switch (for example, a SW2 shown in FIG. 2) for moving effective data to one 8 byte parallel data from another 8 byte parallel data following the one 8 byte parallel data, to arrange 16 byte parallel data, on the information on transparent data and the effective byte number; a pointer (for example, a pointer 304 shown in FIG. 7) for determining addresses at which the 16 byte parallel data are rearranged, on the effective byte number; and a data array unit (for example, a F/F Array 305 shown in FIG. 7) for moving effective data to one 16 byte parallel data from another 16 byte parallel data following the one 16 byte parallel data, to rearrange 16 byte parallel data filled with effective data, at the addresses, on the basis of effective byte number and the addresses.

In accordance with a fourth aspect of the present invention, a data processing method of data in a high-speed serial data communication, comprises the steps of: converting high-speed serial data to 16 byte parallel data; detecting information on transparent data from the 16 byte parallel data; converting transparent data and operating an effective byte number, of the 16 byte parallel data, for every 4 byte parallel data, on the basis of the information on transparent data; moving effective data to one 4 byte parallel data from another 4 byte parallel data following the one 4 byte parallel data, to arrange 8 byte parallel data, on the information on transparent data and the effective byte number; moving effective data to one 8 byte parallel data from another 8 byte parallel data following the one 8 byte parallel data, to arrange 16 byte parallel data, on the information on transparent data and the effective byte number; determining addresses at which the 16 byte parallel data are rearranged, on the effective byte number; and moving effective data to one 16 byte parallel data from another 16 byte parallel data following the one 16 byte parallel data, to rearrange 16 byte parallel data filled with effective data, at the addresses, on the basis of effective byte number and the addresses.

BRIEF DESCRIPTION OF THE DRAWINGS

The present invention will become more fully understood from the detailed description given hereinbelow and the accompanying drawings which are given by way of illustration only, and thus are not intended as a definition of the limits of the present invention, and wherein;

FIG. 9 is a table showing an exemplary selection logic of each SW3INT of the SW 3;

PREFERRED EMBODIMENT OF THE INVENTION

Figure 1:
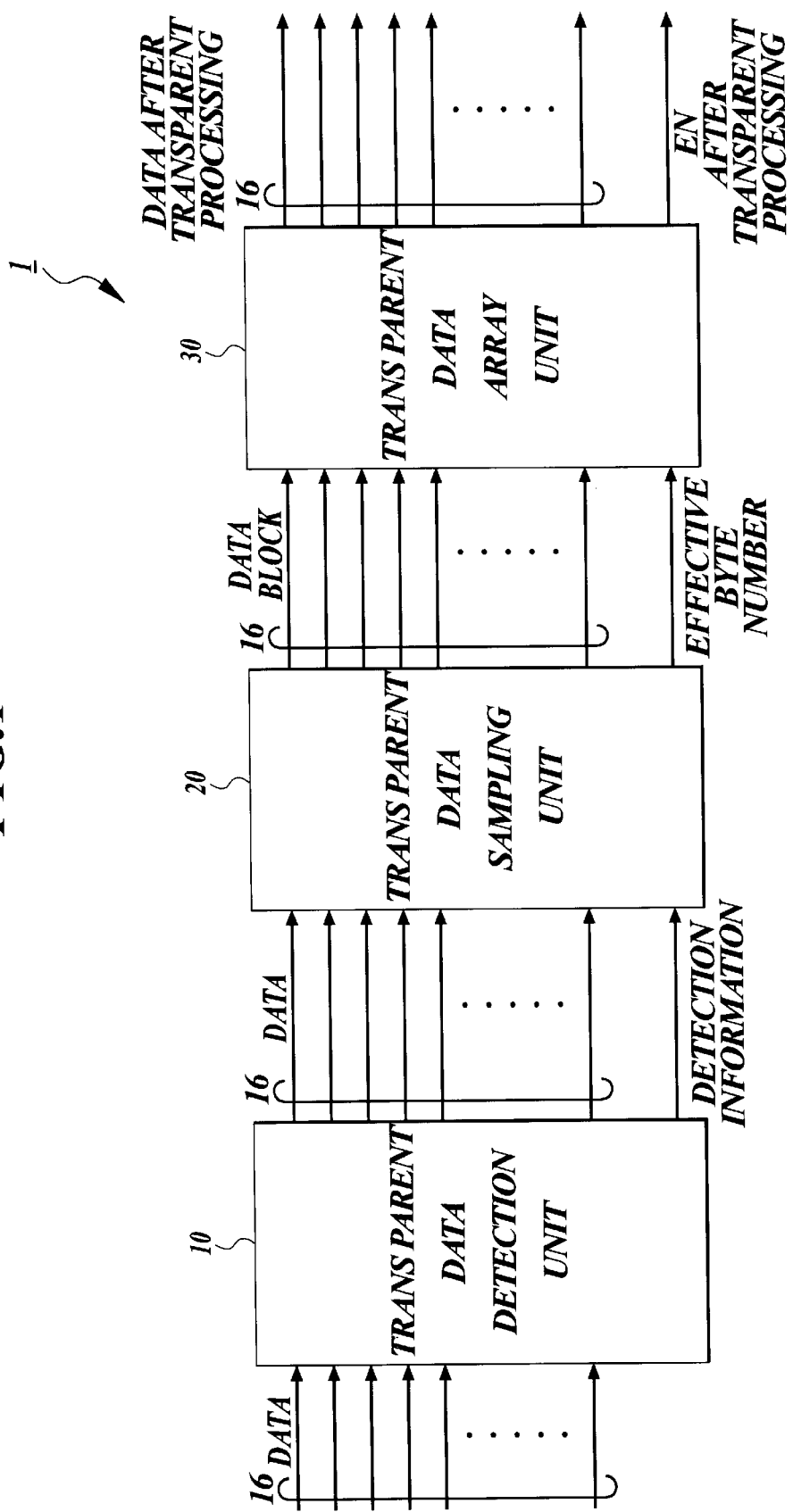
FIG. 1 is a schematic block diagram showing an internal structure of a data processing apparatus 1 according to an embodiment of the present invention.

Hereinafter, an embodiment of the present invention will be explained with reference to figures, in detail.

FIGS. 1 to 11D shows an embodiment of a data processing apparatus 1 to which the present invention is applied.

The data processing apparatus 1 comprises a transparent data detection unit 10, a transparent data sampling unit 20, and a transparent data array unit 30. According to the data processing unit 1, when serial data in the STM-64 are converted to parallel data for every 16 byte (128 bit), and the converted 16 byte parallel data are inputted to the transparent data detection unit 10, the transparent data detection unit 10 detects addresses of data (transparent data) as an object of a transparent processing, in the parallel data. Then, the transparent data sampling unit 20 samples the transparent data from the parallel data, on the basis of the detected addresses, and after moves data after the transparent data, forward, in each parallel data block (it will be called a block in the following). Then, the data array unit 30 rearranges data by moving idle byte data of each block to the forward block.

That is, because the transparent data sampling unit 20 moves data forward in each block after sampling the transparent data from each block, idle byte data are generated in the end of each block. Then, because the data array unit 30 moves data to the idle byte data in each block from the latter block, the block filled with data is generated.

Herein, the transparent data is data converted to a predetermined data at the transmitting side, in order to distinguish original data comprising the same code as that of idle data from idle data.

As described above, the data processing apparatus 1 converts high-speed serial data in the STM-64 to 16 byte parallel data, and processes the 16 byte parallel data. Accordingly, it is possible to easily perform the transparent processing only by a relatively low-speed device.

At first, the structure of the data processing apparatus 1 will be explained, as follows.

FIG. 1 is a schematic block diagram showing an internal structure of the data processing apparatus 1 according to the embodiment of the present invention. As shown in FIG. 1, the data processing apparatus 1 comprises a transparent data detection unit 10, a transparent data sampling unit 20, and a transparent data array unit 30. Further, the data processing apparatus 1 comprises an interface which is not shown in figures and will be called an I/F in the following, at an input terminal thereof. When the I/F receives serial data, the I/F extracts data other than idle data from the received serial data, converts the data to 16 byte parallel data, and outputs the 16 byte parallel data to the transparent data detection unit 10.

The transparent data detection unit 10 detects transparent data in the parallel data outputted from the I/F. Detecting the transparent data, the transparent data detection unit 10 detects the transparent data in each data and data next to the data of the parallel data, latches the latter parallel data, and detects transparent data in the combination of the last address data in the former data and the first address data in the latter data.

The transparent data 10 transmits detection information on the transparent data, for example, address (block and byte of the block) of the transparent data, and the parallel data inputted thereto, to the transparent data sampling unit 20, together.

The transparent data sampling unit 20 converts the transparent data of each block to original data, on the basis of the detection information on the transparent data outputted from the transparent data detection unit 10. Then, the transparent data sampling unit 20 detects the number of data (effective byte number) in one block after sampling the transparent data. Then, the transparent data sampling unit 20 outputs the data block arranged and the effective byte number of the data block, to the transparent data array unit 30.

Herein, the structure of the transparent data sampling unit 20 will be explained.

Figure 2:
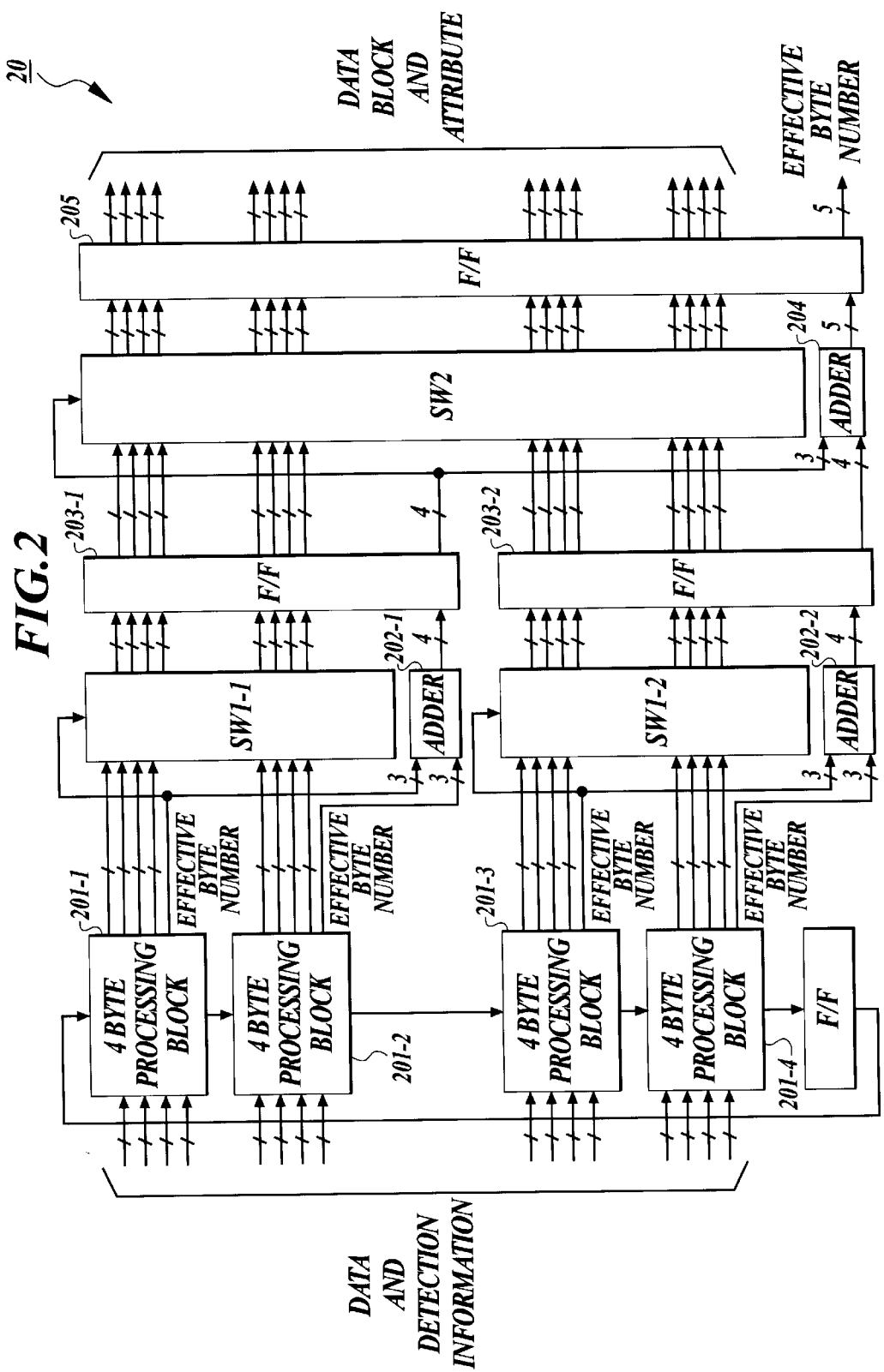
FIG. 2 is a block diagram showing an exemplary internal structure of a transparent data sampling unit 20 of the data processing apparatus 1.

FIG. 2 is a block diagram showing an internal circuit of the transparent data sampling unit 20. In the internal circuit shown in FIG. 2, the transparent data sampling unit 20 comprises four 4 byte processing blocks 201_1 to 201_4, two SW1_1 and SW1_2, two adders 202_1 and 202_2, two flip-flops (F/Fs) 203_1 and 203_2, a SW2, an adder 204, and a flip-flop (F/F) 205.

When the transparent data sampling unit 20 receives 16 byte parallel data and the detection information outputted from the transparent data detection unit 10, the transparent data sampling unit 20 partitions the 16 byte parallel data into four 4 byte processing block data, inputs four 4 byte data to four 4 byte processing blocks 201_1 to 201_4, respectively, and performs the transparent processing.

When each of 4 byte processing blocks 201_1 to 201_4 receives 4 byte data, each 4 byte processing block detects the effective byte number in the 4 byte data, and extracts transparent data from the 4 byte data. Herein, the 4 byte processing block extracts transparent data from the combination of the last data of the 4 byte data thereof and the top data of 4 byte data of the latter 4 byte processing block. Then, the 4 byte processing block 201_1 outputs the data with no transparent data to the SW1_1 and the effective number to the SW1_1 and the adder 202_1, the 4 byte processing block 201_2 outputs the data with no transparent data to the SW1_1 and the effective number to the adder 202_1, the 4 byte processing block 201_3 outputs the data with no transparent data to the SW1_2 and the effective number to the SW1_2 and the adder 202_2, and the 4 byte processing block 201_4 outputs the data with no transparent data to the SW1_2 and the effective number to the adder 202_2.

Then, when the SW1_1 receives the data with no transparent data from the 4 byte processing blocks 201_1 and 201_2 and the effective byte number from the 4 byte processing block 201_1, the SW1_1 removes two 4 byte data to 8 byte data, on the basis of the effective byte number, and outputs the 8 byte data to the F/F 203_1. Further, when the adder 202_1 receives the effective byte numbers from the 4 byte processing blocks 201_1 and 201_2, the adder 202_1 adds the effective byte numbers, and outputs the total effective byte number to the F/F 203_1.

Further, when the SW1_2 receives the data with no transparent data from the 4 byte processing blocks 201_3 and 201_4 and the effective byte number from the 4 byte processing block 201_3, the SW1_2 removes two 4 byte data to 8 byte data, on the basis of the effective byte number, and outputs the 8 byte data to the F/F 203_2. Further, when the adder 202_2 receives the effective byte numbers from the 4 byte processing blocks 201_3 and 201_4, the adder 202_2 adds the effective byte numbers, and outputs the total effective byte number to the F/F 203_2.

Then, when the following SW2 receives the data with no transparent data from F/Fs 203_1 and 203_2 and the effective byte number from the F/F 203_1, the SW2 removes two 8 byte data to 16 byte data on the basis of the effective byte number, and outputs the 16 byte data to the F/F 205. Further, when the adder 204 receives the effective byte numbers from the F/Fs 203_1 and 203_2, the adder 204 adds the effective byte numbers, and outputs the total effective byte number to the F/F 205.

Thereafter, when the F/F 205 receives the 16 byte data from the SW2 and the effective number from the adder 204, the F/F 205 outputs the data block, the attribute of the data block and the effective byte number, to the transparent data array unit 30.

Figure 3:
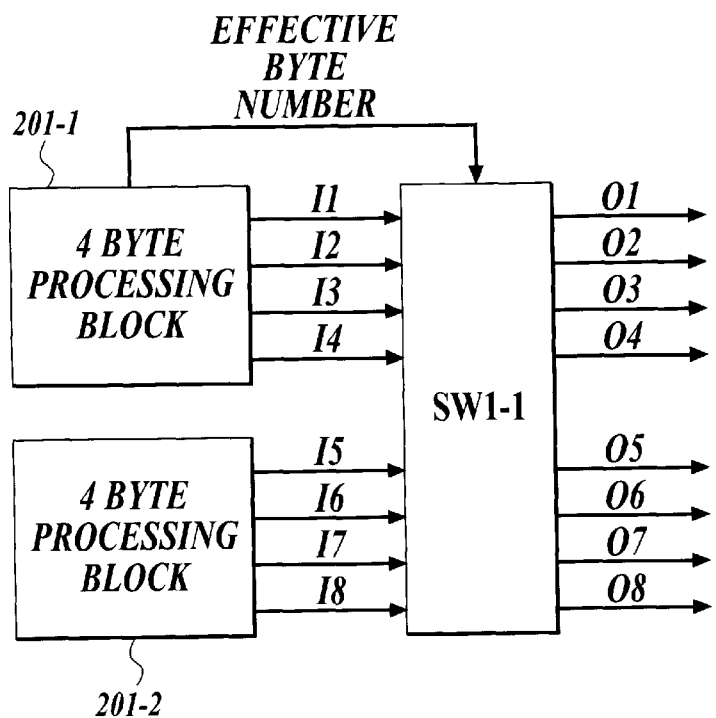
FIG. 3 is a block diagram showing an exemplary internal structure of 4 byte block processing blocks 201 and a SW1 of the transparent data sampling unit 20.

FIG. 3 is a block diagram showing a detailed internal structure of the 4 byte processing blocks 201 and the SW1. Herein, the 4 byte processing blocks 201_1 and 201_2 and the SW1_1 will be explained, as an example.

Figure 4:
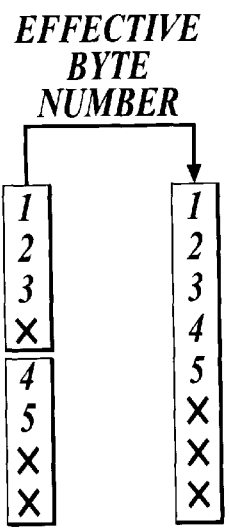
FIG. 4 is a block diagram showing exemplary output data outputted from the 4 byte block processing blocks 201 and the SW1.

When the 4 byte processing blocks 201_1 and 201_2 output the data I1 to I4 and I5 to I8, from which the transparent data are extracted, to the SW1_1, the 4 byte processing block 201_1 outputs the effective byte number of the data I1 to I4, to the SW1_1. When the SW1_1 receives the data I1 to I8 and the effective byte number, the SW1_1 moves the effective data of the data I5 to I8 outputted from the 4 byte processing block 201_2, forward, in the 8 byte data I1 to I8, on the basis of the effective byte number, according to the selection logic of the SW1_1, and arranges the 8 byte data in the parallel data, for example, as shown in FIG. 4. Then, the SW1_1 outputs the 8 byte data O1 to O8.

FIG. 4 is a block diagram showing exemplary output data outputted from the 4 byte processing blocks 201_1 and 201_2 and the SW1_1.

In case the data I1 to I4 and I5 to I8 inputted to the SW1_1 from the 4 byte processing block 201_1 and 201_2 are "1", "2", "3" and "X", and "4", "5", "X" and "X", because the effective byte number inputted to the SW1_1 from the 4 byte processing block 201_1 is "3", the SW1_1 moves the data "4" and "5" forward by one byte, and rearranges 8 byte data. Therefore, the data O1 to O8 outputted from the SW1_1 are "1", "2", "3", "4", "5", "x", "x", and "x".

Then, the SW1_1 outputs the 8 byte data to the F/F 203_1. When the F/F 203_1 receives the 8 byte data, the F/F 203_1 latches the 8 byte data, and outputs the 8 byte data with the effective byte number of the 8 byte data, outputted from the adder 202_1, to the SW2, at the predetermined timing. Further, the SW1_2 outputs the 8 byte data to the F/F 203_2, and the F/F 203_2 outputs the 8 byte data to the SW2, at the predetermined timing.

Figure 5:
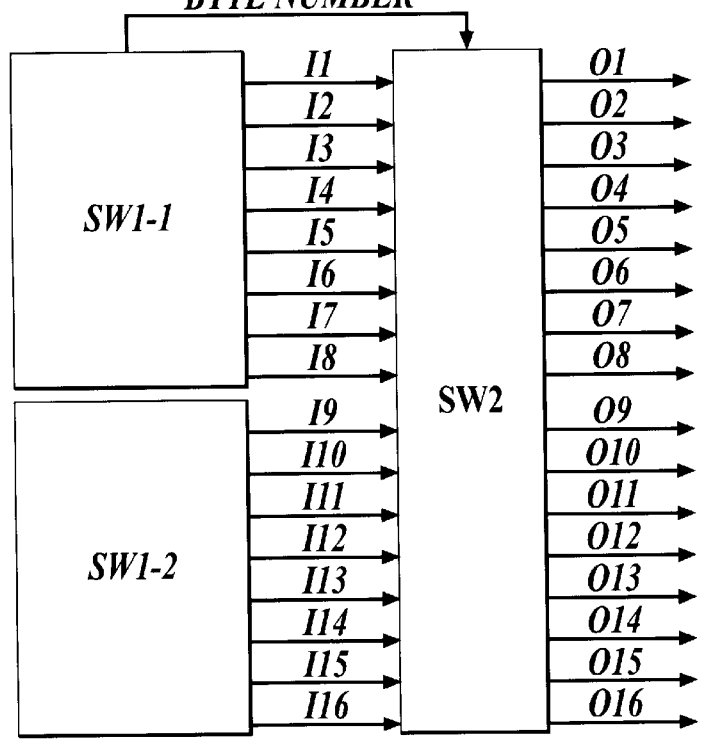
FIG. 5 is a block diagram showing an exemplary internal structure of the SWs1 and a SW2 of the transparent data sampling unit 20.

FIG. 5 is a block diagram showing a detailed internal structure of the SW1_1, the SW1_2 and the SW2.

Figure 6:
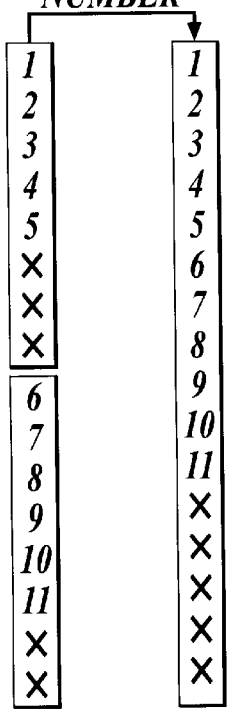
FIG. 6 is a block diagram showing exemplary output data outputted from the SWs1 and the SW2.

When two SW1_1 and SW1_2 output 8 byte parallel data I1 to I8 and I9 to I16, respectively, and the SW1_1 outputs the effective byte number, to the SW2, the SW2 receives the 16 byte parallel data I1 to I16 and the effective byte number. At first, the SW2 moves the effective data of the 8 byte data I9 to I16 outputted from the SW1_2 forward, in the 16 byte I1 to I16, on the basis of the effective byte number, according to the byte number of idle data of the 8 byte data I1 to I8, and arranges the 16 byte data in the parallel data, for example, as shown in FIG. 6. Then, the SW2 outputs the 16 byte data O1 to O16.

FIG. 6 is a block diagram showing exemplary output data outputted from the SW1_1, the SW1_2 and the SW2.

In case the data I1 to I8 and I9 to I16 inputted to the SW2 from the SW1_1 and the SW1_2 are "1", "2", "3", "4", "5", "x", "x" and "x", and "6", "7", "8", "9", "10", "11", "x" and "x", because the effective byte number inputted to the SW2 from the SW1_1 is "5", the SW2 moves the data "6", "7", "8", "9", "10" and "11" forward by three bytes, and rearranges 16 byte data. Therefore, the data O1 to O16 outputted from the SW2 are "1", "2", "3", "4", "5", "6", "7", "8", "9", "10", "11", "X", "X", "X", "X" and "X".

Then, the SW2 outputs the 16 byte parallel data to the F/F 205. When the F/F 205 receives the 16 byte data, the F/F 205 latches the 16 byte data, and outputs the 16 byte data with the effective byte number of the 16 byte data, outputted from the adder 204, and the attribute of the 16 byte data, to the transparent data array unit 30, at the predetermined timing.

The transparent data array unit 30 writes the data of the data block outputted from the transparent data sampling unit 20, on the basis of the effective byte number outputted from the transparent data sampling unit 20. In case idle byte data are in the data block, the transparent data array unit 30 moves the data from the latter data block forward, and rearrange 16 byte parallel data with no idle byte data, in each data block. Then, the transparent data array unit 30 outputs the 16 byte parallel data with no idle byte data, with an EN (Enable signal), after the transparent processing.

Herein, the structure of the transparent data array unit 30 will be explained.

Figure 7:
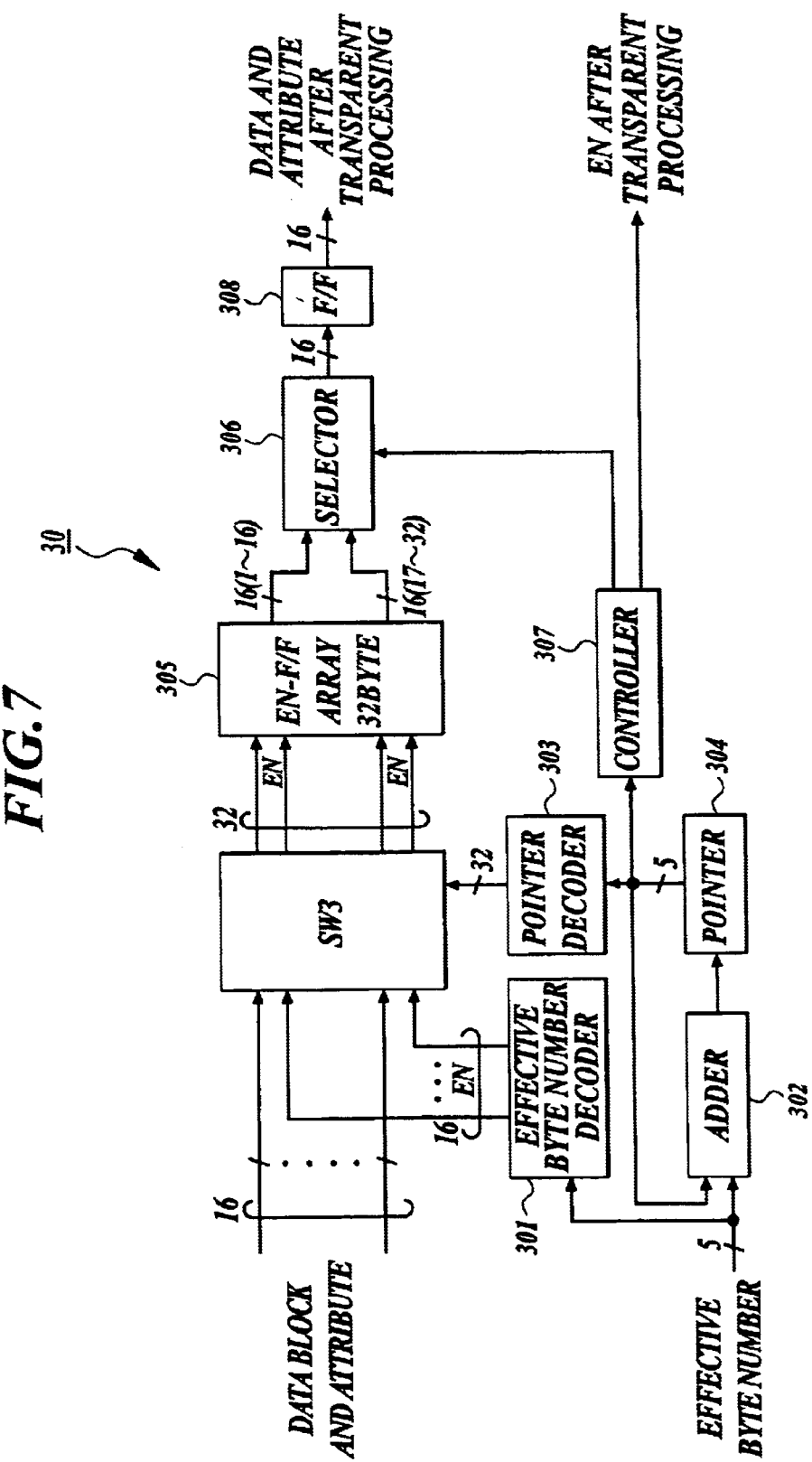
FIG. 7 is a block diagram showing an exemplary internal structure of a transparent data array unit 30 of the data processing apparatus 1.

FIG. 7 is a block diagram showing an exemplary internal circuit of the transparent data array unit 30. In the internal circuit shown in FIG. 7, the transparent data array unit 30 comprises an effective byte number decoder 301, an adder 302, a pointer decoder 303, a pointer 304, a SW3, a F/F Array 305, a selector 306, a controller 307 and a F/F 308.

When the transparent data array unit 30 receives the data block of the 16 byte parallel data, the effective byte number and the attribute, of the data block, the 16 byte parallel data and the attribute are inputted to the SW3, and the effective byte number is inputted to the effective byte number decoder 301 and the adder 302.

The effective byte number decoder 301 generates an enable signal called EN in the following, for indicating whether the data is effective or ineffective. The effective byte number decoder 301 generates sixteen ENs according to the 16 byte data, respectively. The effective byte number decoder 301 generates the "High" level ENs for the data from the high rank to the rank corresponding to the effective byte number, and outputs the ENs to the SW3.

The adder 302 comprises 5 bits, and adds the effective byte number of the latter data block to the effective byte number of the former data block outputted from the transparent data sampling unit 20. Because the adder 302 consists of 5 bit, the adder 302 can count the effective byte number from "0" to "31". In case the effective byte number is over "31", the adder 302 recounts the effective byte number from "0". Therefore, in case the effective byte number is "32", the adder 302 counts the effective byte number as "0". The adder 302 outputs the counted value to the pointer 304.

The pointer 304 comprises a 5 bit F/F, and generates address data of the F/F Array 305. Because the F/F Array 305 comprises thirty-two F/Fs, the pointer 304 gives the individual number that is the pointer value, of any one of "0" to "31" to each of 32 byte. The pointer 304 decides the top address of the latter data block in the F/F Array 305, on the basis of the present pointer value and the effective byte number counted by the adder 302, and generates thirty-two address data.

The pointer decoder 303 outputs thirty-two address data generated by the pointer 304, to SW3INTs of the SW3 corresponding to each address data. Herein, the pointer decoder 303 outputs sixteen address data to each SW3INT of the SW3. Although the SW3 comprises thirty-two SW3INTs, the parallel data comprises only 16 bytes. Therefore, the pointer decoder 303 extracts sixteen address data from thirty-two address data, for each SW3INT, and outputs the sixteen address data to each SW3INT. Then, the pointer decoder 303 decides one effective address data of thirty-two address data, and thereby, the data outputted from each SW3INT is selected corresponding to the effective address data.

The SW3 comprises thirty-two SW3INTS. The SW3 outputs only the effective data from the top address decided by the pointer 304, to the F/F Array 305, in order, on the basis of the 16 byte parallel data with no transparent data, the sixteen ENs outputted from the effective byte number decoder 301, and the thirty-two address data outputted from the pointer decoder 303.

Figure 8:
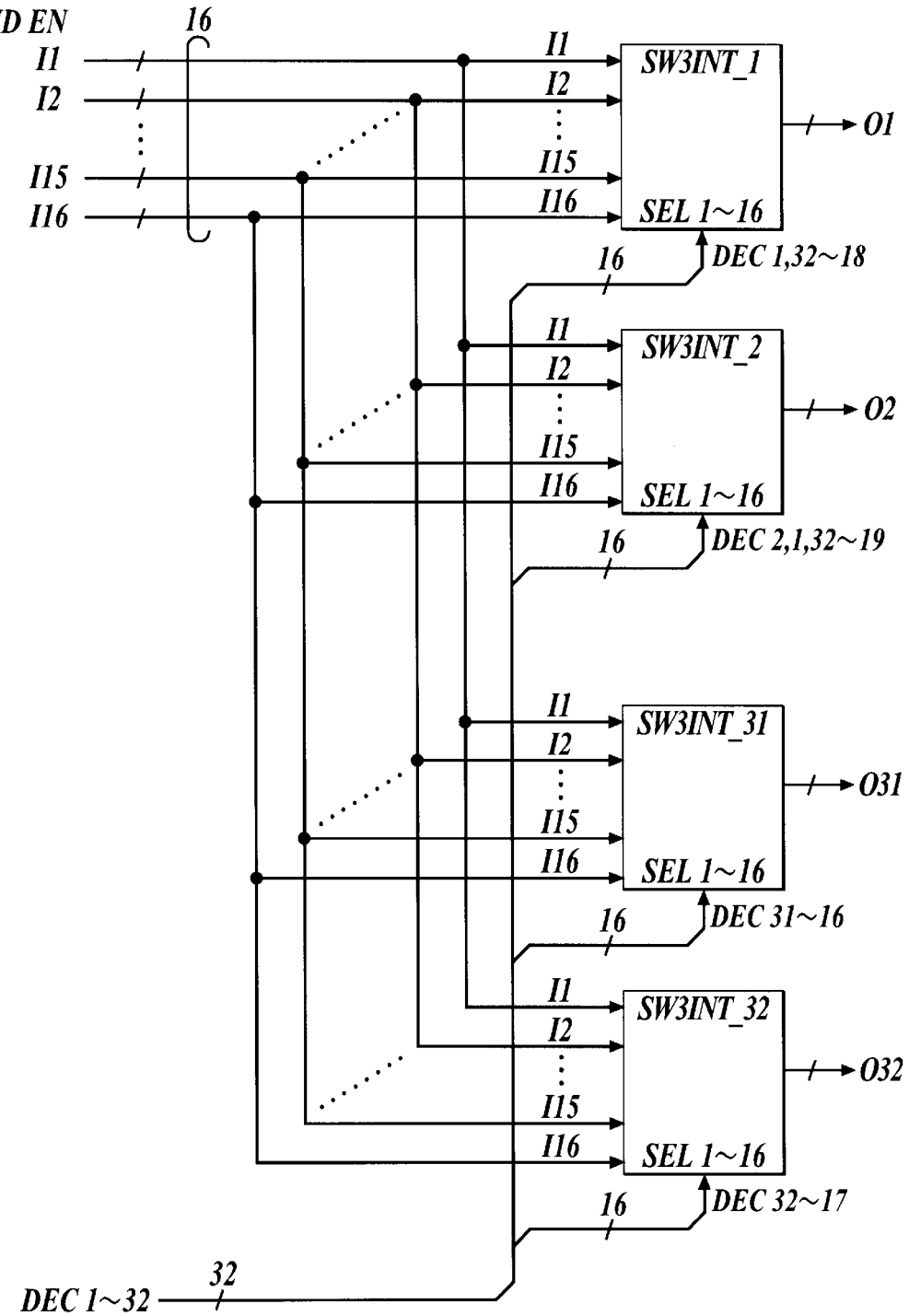
FIG. 8 is a block diagram showing an exemplary internal structure of a SW3 of the transparent data array unit 30.

FIG. 8 is a block diagram showing an exemplary detailed internal structure of the SW3.

As shown in FIG. 8, the SW3 comprises thirty-two SW3INT_1 to SW3INT_32. The data block of the 16 byte parallel data I1 to I16 with no transparent data, the sixteen ENs outputted from the effective byte number decoder 301, corresponding to the 16 byte data I1 to I16, respectively, and the attribute of the data block are inputted to each of thirty-two SW3INTs.

Further, the thirty-two address data DEC 1 to 32 outputted from the pointer decoder 303 are inputted to each of SW3INT_1 to SW3INT_32, according to the address of each SW3INT. More specifically, because the 16 byte parallel data I1 to I16 are inputted to each SW3INT, each SW3INT needs sixteen address data. Therefore, the sixteen address data are extracted from the thirty-two address data DEC 1 to 32 outputted from the pointer decoder 303, according to the address of each of SW3INT_1 to SW3INT_32, and outputted to each SW3INT.

For example, when the SW3INT_1 receives the 16 byte data I1 to I16, and the sixteen DEC 1, 32 to 18 extracted from thirty-two DEC 1 to 32, as the address data, the data I1 and the DEC1 are inputted to a SEL (Selector) 1 of the SW3INT_1, and the data I2 to I16 and the DEC 32 to 18 are inputted to SELs 2 to 16, respectively. Therefore, in case the DEC 1 is effective, the data I1 inputted to the SEL 1 to which the DEC 1 is inputted is outputted as the data O1. Further, the SW3INT_2 receives DEC 2, 1, 32 to 19 as the address data, the SW3INT_31 receives DEC 31 to 16, and the SW3INT_32 receives the DEC 32 to 17.

Each of the SW3INT_1 to SW3INT_32 selects one byte data of the 16 byte data with no transparent data, on the basis of the selection logic of each SW3INT. Thereby, the SW3INT_1 to SW3INT_32 output thirty-two byte data as O1 to O32, to the F/F Array 305.

FIG. 9 shows a schematic table of the selection logic of each SW3INT of the SW3.

In the table of the selection logic shown in FIG. 9, the SW3 comprises sixteen SW3INTs, which are SW3INT_1 to SW3INT_16, and the 8 byte parallel data are inputted to the SELs 1 to 8 of each SW3INT.

For example, in case the address of the last data in the former data block is indicated at the pointer "4", that is the last data is outputted from the SW3INT_5, the address of the top data in the latter data block is indicated at the pointer "5". Therefore, the pointer decoder 303 determines the DEC 6 to be effective such that the top data in the latter data block is outputted from the SW3INT_6 through the SEL 1.

Therefore, when the SEL 1 is selected in the SW3INT__6, the SEL 2 is selected in the SW3INT__7, and the SELs 3 to 8 are selected in the SW3INT__8 to SW3INT__13, in order, the 8 byte parallel data are serially outputted from the SEL 1 of the SW3INT__6 to the SEL 8 of the SW3INT__13. Because the address data other than the DEC 6 are ineffective, it will be understood that the effective data of the 16 byte data outputted from the SW3INT__1 to SW3INT__16 are eight bytes.

According to the embodiment, the selection logic is extended such that the SW3 comprises thirty-two SW3INTs and the 16 byte parallel data are inputted to the SELs1 to 16 of each SW3INT, respectively. Consequently, it will be understood that the effective data of the 32 byte data O1 to O32 outputted from the SW3 are sixteen bytes.

Further, only the data set "High" by the EN of the 16 byte data selected is actually outputted to the F/F Array 305, as the effective data.

The F/F Array 305 has the structure such that the thirty-two byte F/Fs are arranged on a parallel with each other. Further, each of the thirty-two byte F/Fs has an individual address. Therefore, the F/F Array 305 receives the address data determined by the pointer 304 from the SW3, the F/F Array 305 writes only the effective data therein, in order, according to the address data determined by the pointer 304. Every when the effective data are written in the first half 16 byte F/Fs of the F/F Array 305, or in the latter half 16 byte F/Fs of the F/F Array 305, the 16 byte parallel data are read out from the F/F Array 305, as the data after the transparent processing, by the selector 306.

Figure 10:
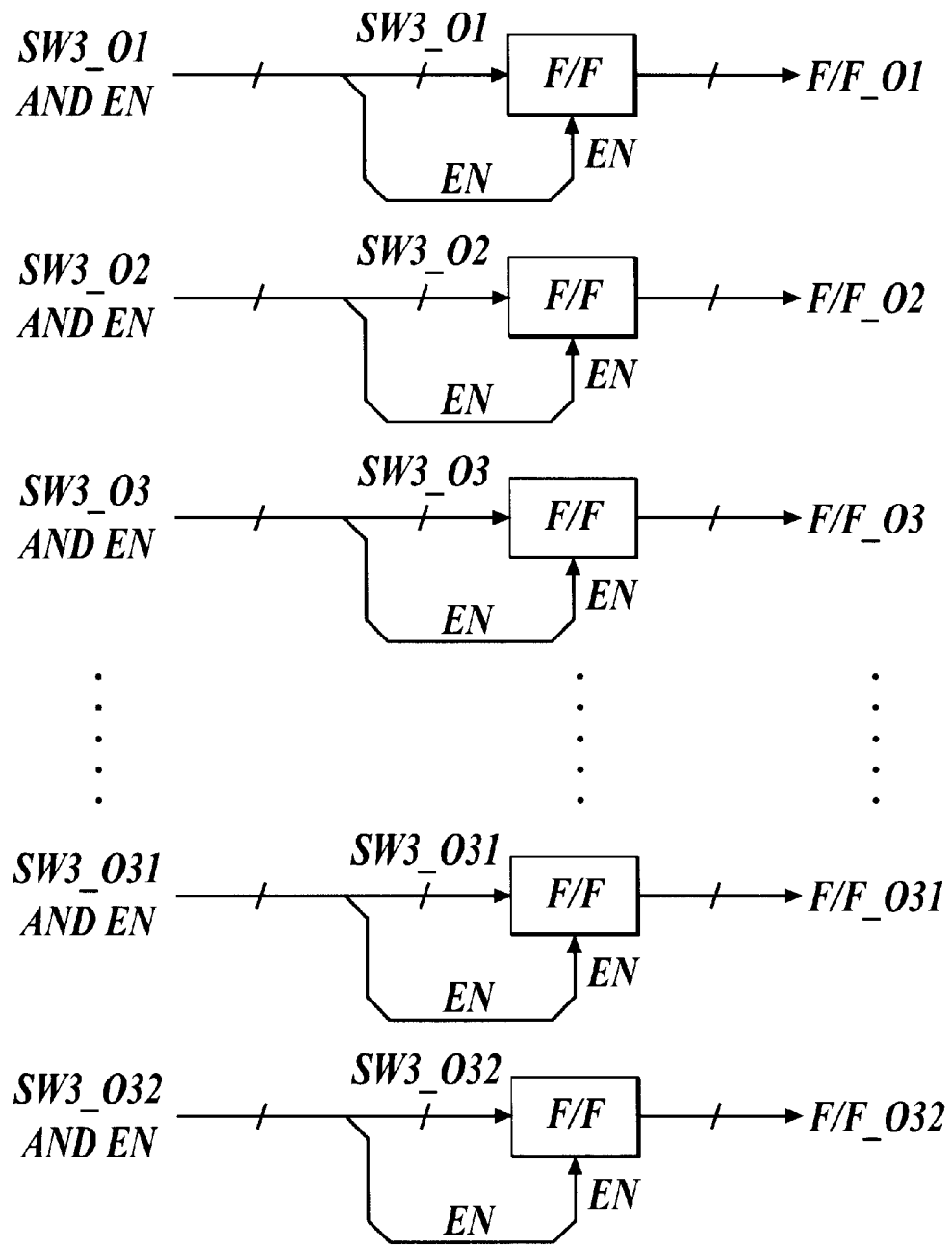
FIG. 10 is a block diagram showing an exemplary internal structure of a F/F Allay 305 of the transparent data array unit 30.

FIG. 10 shows a block diagram of an exemplary detailed internal structure of the F/F Array 305.

As shown in FIG. 10, the F/F Array 305 comprises thirty-two F/Fs. The thirty-two data that are SW3__O1 to SW3__O32 and ENs indicating whether the SW3__O1 to SW3__O32 are effective or not, respectively, outputted from the SW3INT__1 to SW3INT__32 are inputted to the F/Fs, respectively. Each F/F decides whether each of SW3__O1 to SW3__O32 is effective or not, on the basis of the EN corresponding to each of SW3__O1 to SW3__O32, latches only the data decided to be effective, and writes the data therein.

Herein, an exemplary data writing principle executed by the F/F Allay 305 will be explained with reference to FIGS. 11A to 11D.

Figure 11B:
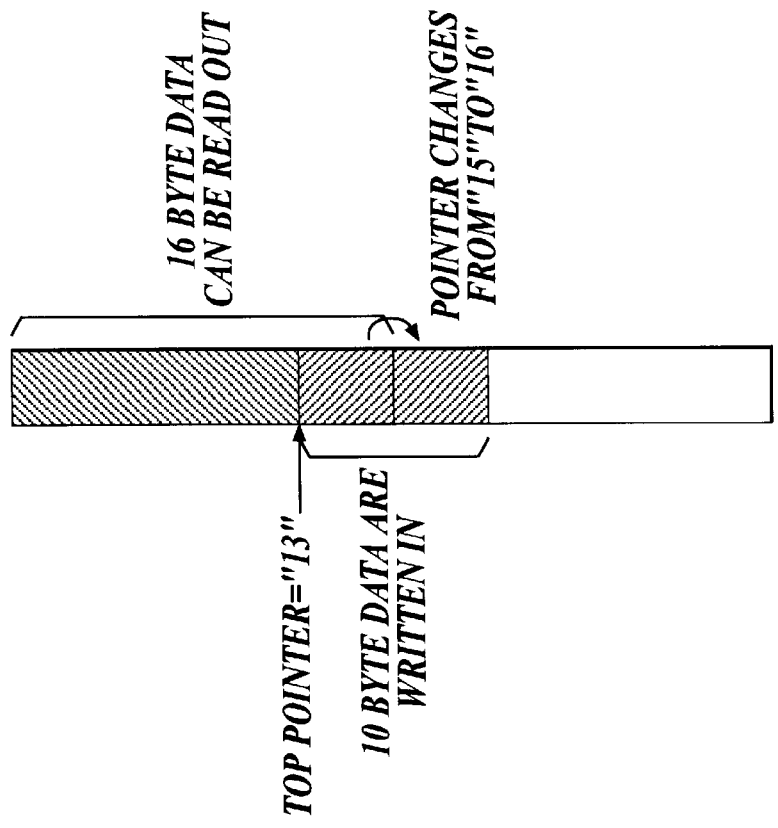
FIGS. 11A to 11D are block diagrams showing an exemplary data writing principle of the F/F Allay 305.
Figure 11A:
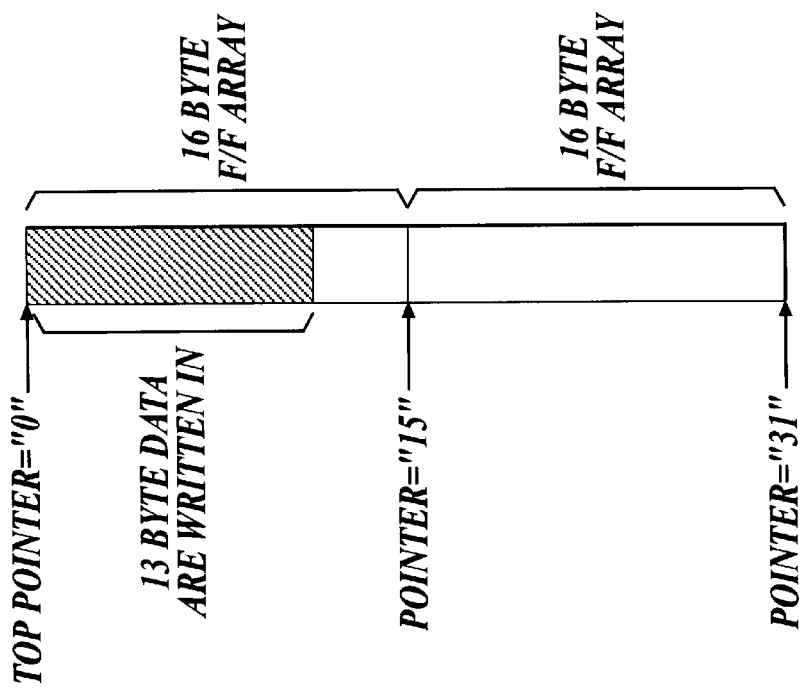

As shown in FIG. 11A, in case the address data of the data block inputted to the F/F Array 305 is determined to be the pointer "0" by the pointer 304, and the effective byte number of the data block is "13", the 13 byte data are written from the F/F indicated at the top pointer "0" in the F/F Array 305.

Then, as shown in FIG. 11B, in case the address data of the data block inputted to the F/F Array 305, next to the 13 byte data is determined to be the pointer "13" by the pointer 304, and the effective byte number of the data block is "10", the 10 byte data are written from the F/F indicated at the top pointer "13" in the F/F Array 305.

Herein, because the first half 16 byte F/Fs of the 32 byte F/Fs in the F/F Array 305 have been filled with the effective data, the first half 16 byte data written in the first half 16 byte F/Fs can be read out from the F/F Array 305 by the selector 306. The state is shown in FIG. 11C, that the first half 16 byte data have been read out from the F/F Array 305 and the 7 byte data are remaindered in the latter F/Fs.

Herein, all the write progress state is decided according to the pointer value controlled by the pointer 304. More specifically, in case the data have been written in the first half F/Fs of the 32 byte FIFs, that is to the F/F indicated at the pointer "15", when the pointer changes from "15" to "16", the first half 16 byte data can be read out from the F/F Array 305.

That is, according to the pointer 304 comprising 5 bits, because the pointer "16" is "10000", it will be understood that the first half 16 byte data can be read out when the fifth bit changes from "0" to "1". Like the above-described case, in case the data have been written in the latter half F/Fs of the 32 byte F/Fs, that is to the F/F indicated at the pointer "31", when the pointer changes from "31" to "0", the latter half 16 byte data can be read out from the F/F Array 305. That is, according to the pointer 304, because the pointer "0" is "00000", it will be understood that the latter half 16 byte data can be read out when the fifth bit changes from "1" to "0".

That is, it is detected that the fifth bit of the pointer 304 changes from "0" to "1" or from "1" to "0", and thereby, it is possible to control that the data are read out for every 16 byte from the F/F Array 305. The change from "0" to "1" or from "1" to "0", of the fifth bit of the pointer 304 is detected by the following controller 307, and it will be explained in detail, as follows.

Figure 11D:
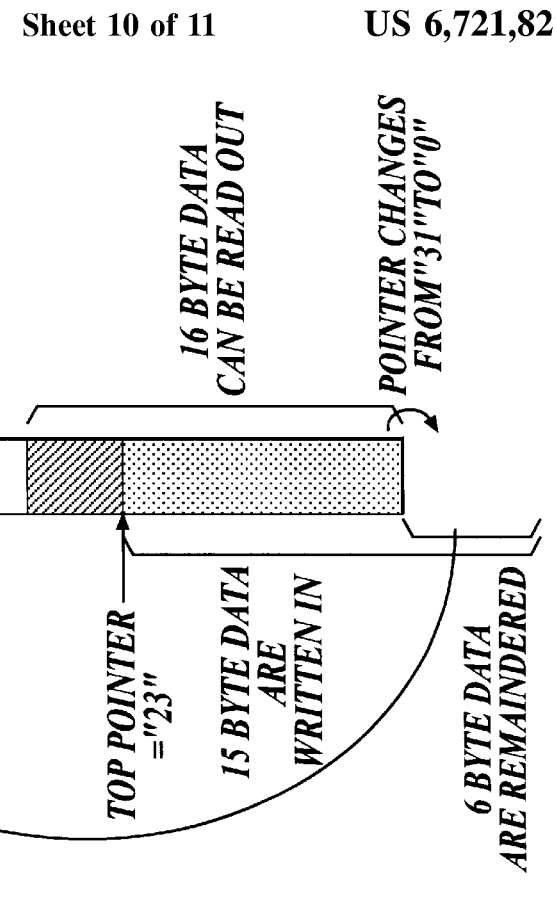
Figure 11C:
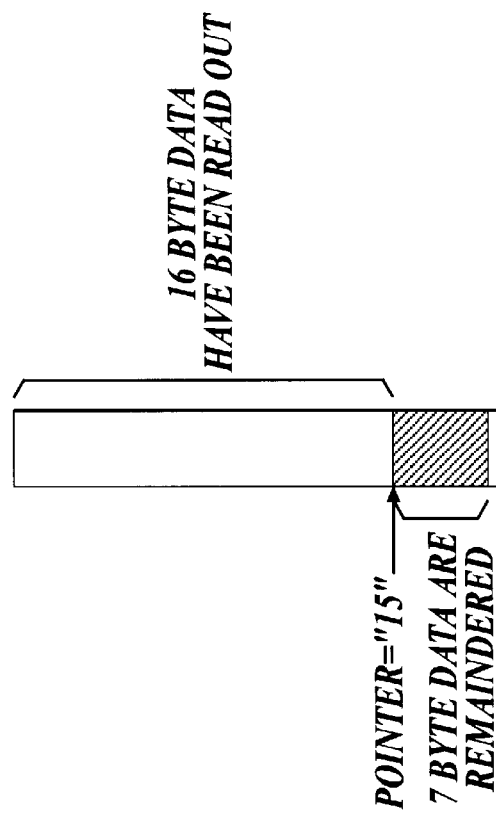
Figure 12:
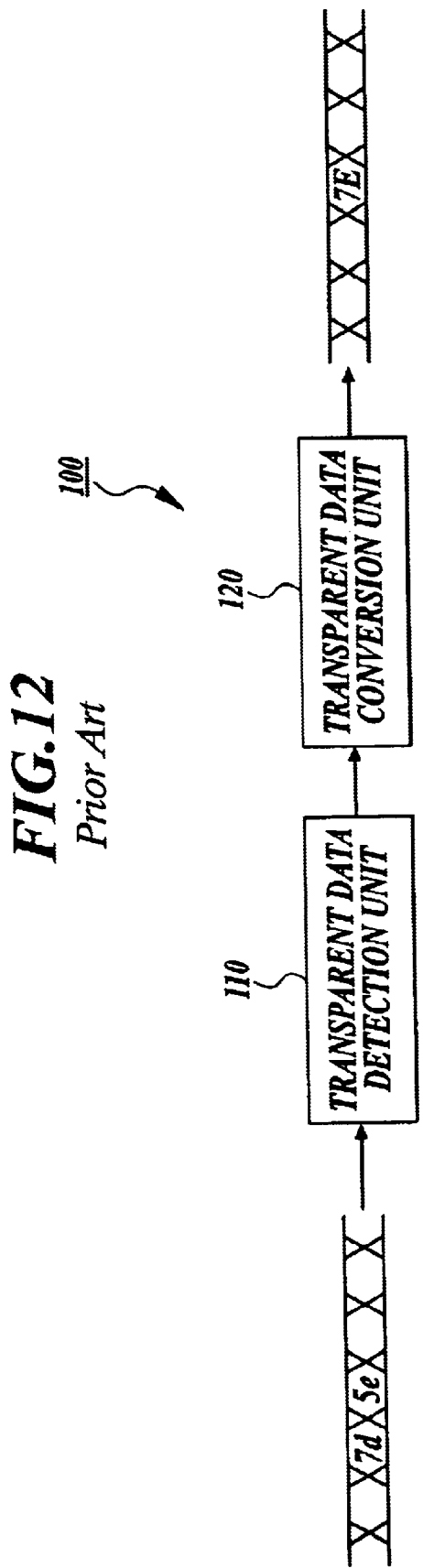
FIG. 12 is a schematic block diagram showing a transparent processing according to an earlier development.

As show in FIG. 11D, the address data of the data block inputted do the F/F Array 305, next to the 10 byte data is determined to be the pointer "23" by the pointer 304. The data block is written from the F/F indicated at the top pointer "23" next to the pointer indicating the F/F in which the former data block has been written, in the F/F Array 305, in order to keep the series of the data, even if the first half 16 byte F/Fs are idle.

The 15 byte data in the data block having the effective byte number "15" are written from the F/F indicated at the top pointer "23", in the F/F Array 305. Herein, because the F/F Array 305 comprises the 32 byte F/Fs, when the 15 byte data are written from the F/F indicated at the pointer "23", it is possible that only the 9 byte data are written in the latter half F/Fs of the F/F Array 305. Therefore, the first 9 byte data of the 15 byte data are in the latter half F/Fs of the F/F Array 305, and the 6 byte remaindered data are written in the first half F/Fs of the F/F Array 305.

Then, when it starts to write the data in the first half F/Fs of the F/F Array 305, it is detected that the fifth bit of the pointer 304 changes from "1" to "0", that is the pointer changes from "31" to "0". Therefore, the 16 byte data can be read out from the latter half 16 byte F/Fs of the F/F Array 305, by the selector 306.

Accordingly, because only the effective data are written in the F/F Array 305, the data can be rearranged without generating idle byte data and idle data block.

The selector 306 reads out the 16 byte data from the first half 16 byte F/Fs and the latter half 16 byte F/Fs of the F/F Array 305, separately, in order, according to the instruction signal outputted from the controller 307, when the effective data are written in the F/F Array 305, in order. Then, the selector 306 outputs the 16 byte data to the F/F 308.

The controller 307 detects that the fifth bit of the pointer 304 changes from "0" to "1" and from "1" to "0", and outputs the instruction signal to the selector 306. The selector 306 is controlled of reading out the data from the F/F Array 305, according to the instruction section of the controller 307, that is the pointer value of the pointer 304.

More specifically, when the pointer changes from "15" to "16", and the pointer changes from "31" to "0", the data are read out from the F/F Array 305. The change that the pointer changes from "15" to "16" is that the pointer 304 changes from "01111" to "10000", and the change that the pointer changes from "31" to "0" is that the pointer 304 changes from "11111" to "00000". That is, the changes of the pointer can be detected by detecting the changes in the fifth bit of the pointer 304 from "0" to "1" and from "1" to "0".

Accordingly, the controller 307 detects only the change in the fifth bit of the pointer 304 from "0" to "1" and from "1" to "0", and outputs the instruction signal to the selector 306. Further, the controller 307 generates and outputs the EN after the transparent processing. The EN after the transparent processing is "Low" when the data can be read out from the selector 306, that is the first half F/Fs or the latter half F/Fs of the F/F Array 305 are not filled with 16 byte data, while the EN after the transparent processing is "High" when the data can be read out from the selector 306, that is the first half F/Fs or the latter half F/Fs of the F/F array 305 are filled with 16 byte data.

The 16 byte parallel data read out from the selector 306 to the F/F 308, are outputted as data after the transparent processing, with the attribute of the data, at the predetermined timing.

Next, the data processing according to the embodiment of the present invention will be explained, as follows.

When the data processing apparatus 1 receives serial data based on the STM, the interface (I/F) which is not shown in figures, extracts data other than idle data from the serial data, and converts the data into 16 byte parallel data.

When the I/F outputs the 16 byte parallel data to the transparent data detection unit 10, the transparent data detection unit 10 detects an address that is a block number and a byte number of the block, of transparent data in the converted 16 byte parallel data. Then, the transparent data detection unit 10 outputs the detection information including the address, with the 16 byte parallel data, to the transparent data sampling unit 20.

Then, in the transparent data sampling unit 20, when the processing blocks receive the 16 byte parallel data, for every four byte, respectively, the processing blocks perform the transparent data sampling that is the transparent processing, to the data, on the basis of detection information. Then, the SW1 moves effective data of the latter 4 byte data block to the former 4 byte data block in which idle byte data are generated by sampling transparent data, on the basis of the effective byte number, and generates 8 byte parallel data. Further, the SW2 moves effective data of the latter 8 byte data block to the former 8 byte data block, on the basis of the effective byte number, and generates 16 byte parallel data in which idle byte data are arranged at the bottom thereof, after the transparent data sampling.

Then, the transparent data sampling unit 20 outputs the 16 byte parallel data after the transparent data sampling, with the effective byte number, to the transparent data array unit 30. In the transparent data array unit 30, the SW3 receives the 16 byte parallel data after the transparent data sampling, and the effective byte number decoder 301 and the adder 302 receives the effective byte number.

The effective byte number decoder 301 generates the enable signal (EN) of indicating whether the data is effective or ineffective, on the basis of the effective byte number inputted to the effective byte number decoder 301, and the pointer 304 generates the address data for the F/F Array 305, on the basis of the effective byte number inputted to the adder 302.

When the SW3 receives the EN and the address data, the SW3 determines the address only for effective data of the 16 byte parallel data as data after the transparent data sampling, on the basis of the EN and the address data, and outputs the effective data to the F/F Array 305.

When the F/F Array 305 receives the effective data, the F/F array 305 writes the data in 32 byte F/Fs thereof, in order to generate idle byte data and idle data block therein. Then, every when the half 16 byte data of 32 byte data are written in the F/F Array 305, the selector 306 reads out the 16 byte data from the F/F Array 305, in order. The timing at which the selector 306 reads out the 16 byte data from the F/F Array 305 is controlled by the controller 307 detecting that the fifth bit of the pointer 304 changes from "0" to "1" and from "1" to "0".

When the selector 306 reads out the 16 byte parallel data, the selector 306 outputs the data to the F/F 308. Then, the F/F 308 outputs the 16 byte parallel data as data after the transparent processing, at the predetermined timing. Therein, the data after the transparent processing are data wherein all the transparent data are decoded to original data, with no idle byte data and no idle block data.

As described above, the data processing apparatus 1 according to the embodiment of the present invention, performs the transparent processing to high-speed serial data based on the STM-64, for every 16 byte parallel data.

Accordingly, it is possible to easily perform the transparent processing of converting transparent data of received data to original data, by a relatively low-speed device.

Further, according to the data processing apparatus 1, the transparent data detection unit 10, the transparent data sampling unit 20 and the transparent data array unit 30 can be realized by circuits having relatively simple structures.

Accordingly, it is possible to reduce the circuit size and the manufacturing cost of whole the data processing apparatus 1.

Although the present invention has been explained according to the above-described embodiment, it should also be understood that the present invention is not limited to the embodiment and various chanted and modifications may be made to the invention without departing from the gist thereof.

According to the present invention, some effects will be indicated, as follows.

According to the above-described data processing apparatus, because received serial data are converted to a predetermined set of parallel data, and the predetermined set of parallel data are processed on the basis of detected information concerning transparent data, it is possible to easily perform the transparent processing only by a relatively low-speed conventional device.

Further, if transparent data are partitioned into two predetermined set of parallel data when the received serial data are converted to the predetermined set of parallel data, because the information concerning transparent data bridging two predetermined set of parallel data can be detected, it is possible to perform the transparent processing without leaving the transparent data in the predetermined set of parallel data.

Further, because it is possible to determine a number of effective data included in each predetermined set of parallel data, after the transparent processing, it is possible to easily understand a data structure of each predetermined set of parallel data.

Further, the predetermined set of parallel data can be generated by converting transparent data for every another predetermined set of parallel data, and performing the transparent processing to the another predetermined set of parallel data at a plurality of steps. Consequently, because the processing data unit can be reduced, it is possible to arrange parallel data without reducing the processing speed.

Further, it is possible to rearrange parallel data according to a simple signal, only by using a relatively low-speed conventional device, without enlarging a size of a processing circuit.

The entire disclosure of Japanese Patent Application No. Tokugan 2000-333089 filed on Oct. 31, 2000 including specification, claims, drawings and summary are incorporated herein by reference in its entirety.

What is claimed is:

1. A data processing apparatus for use in a high-speed serial data communication, comprising:
    a serial data conversion section for receiving high-speed serial data, and converting the high-speed serial data to first predetermined set of parallel data;
    a transparent data information detection section for detecting information concerning transparent data, from the first predetermined set of parallel data;
    an effective byte number operation section for operating an effective byte number of the first predetermined set of parallel data, on the basis of the information concerning transparent data;
    a transparent data conversion section for converting transparent data of the first predetermined set of parallel data, and moving predetermined data after the transparent data forward, in the first predetermined set of parallel data, to arrange the first predetermined set of parallel data, on the basis of the information concerning transparent data and the effective byte number;
    an address control section for determining addresses at which the first predetermined set of parallel data arranged by the transparent data conversion section are rearranged, on the basis of the effective byte number; and
    a data array section for moving predetermined data to one first predetermined set of parallel data from another first predetermined set of parallel data following the one first predetermined set of parallel data, to rearrange the first predetermined set of parallel data at the addresses, on the basis of the effective byte number and the addresses.

2. The data processing apparatus as claimed in claim 1, wherein the transparent data information detection section comprises a storage section for storing one first predetermined set of parallel data converted by the serial data conversion section therein, and detects the information concerning transparent data from data at a last address of the one first predetermined set of parallel data stored in the storage section and data at a top address of another first predetermined set of parallel data converted following the one first predetermined set of parallel data.

3. The data processing apparatus as claimed in claim 1, wherein the transparent data information detection section comprises:
    a transparent data detection section for detecting an address and a number of transparent data included in the first predetermined set of parallel data converted by the serial data conversion section; and
    a transparent data information transmission section for transmitting the address and the number of transparent data detected by the transparent data detection section, as the information concerning transparent data, to the effective byte number operation section.

4. The data processing apparatus as claimed in claim 1, wherein the transparent data conversion section comprises:
    a plurality of transparent processing sections for converting transparent data of the first predetermined set of parallel data to original data, for every second predetermined set of parallel data, on the basis of the information concerning transparent data detected by the transparent data information detection section; and
    a plurality of data moving sections for moving predetermined data after the transparent data forward, in the second predetermined set of parallel data, on the basis of the effective byte number operated by the effective byte number operation section.

5. The data processing apparatus as claimed in claim 1, wherein the data array section comprises:
    a data reading out section for reading out a third predetermined set of parallel data from the first predetermined set of parallel data every when the third predetermined set of parallel data are rearranged at the predetermined addresses by moving the predetermined data to the one first predetermined set of parallel data from the another first predetermined set of parallel data, on the basis of the effective byte number and the addresses; and
    a read out timing control section for controlling a timing at which the data reading out section reads out the third predetermined set of parallel data, on the basis of the effective byte number and the addresses.

6. A data processing method of data in a high-speed serial data communication, comprising the steps of:
    receiving high-speed serial data, and converting the high-speed serial data to first predetermined set of parallel data;
    detecting information concerning transparent data, from the first predetermined set of parallel data;
    operating an effective byte number of the first predetermined set of parallel data, on the basis of the information concerning transparent data;
    converting transparent data of the first predetermined set of parallel data, and moving predetermined data after the transparent data forward, in the first predetermined set of parallel data, to arrange the first predetermined set of parallel data, on the basis of the information concerning transparent data and the effective byte number;
    determining addresses at which the first predetermined set of parallel data arranged are rearranged, on the basis of the effective byte number; and
    moving predetermined data to one first predetermined set of parallel data from another first predetermined set of parallel data following the one first predetermined set of parallel data, to rearrange the first predetermined set of parallel data at the addresses, on the basis of the effective byte number and the addresses.

7. The data processing method as claimed in claim 6, further comprising the steps of:
    storing one first predetermined set of parallel data converted in a storage section; and
    detecting the information concerning transparent data from data at a last address of the one first predetermined set of parallel data stored in the storage section and data at a top address of another first predetermined set of parallel data converted following the one first predetermined set of parallel data.

8. The data processing method as claimed in claim 6, further comprising the steps of:

detecting an address and a number of transparent data included in the first predetermined set of parallel data converted; and transmitting the address and the number of transparent data detected, as the information concerning transparent data.

9. The data processing method as claimed in claim 6, further comprising the steps of:

converting transparent data of the first predetermined set of parallel data to original data, for every second predetermined set of parallel data, on the basis of the information concerning transparent data; and moving predetermined data after the transparent data forward, in the second predetermined set of parallel data, on the basis of the effective byte number.

10. The data processing method as claimed in claim 6, further comprising the steps of:

reading out a third predetermined set of parallel data from the first predetermined set of parallel data every when the third predetermined set of parallel data are rearranged at the predetermined addresses by moving the predetermined data to the one first predetermined set of parallel data from the another first predetermined set of parallel data, on the basis of the effective byte number and the addresses; and controlling a timing at which the third predetermined set of parallel data is read out, on the basis of the effective byte number and the addresses.

11. A data processing apparatus for use in a high-speed serial data communication, comprising:

an interface section for converting high-speed serial data to 16 byte parallel data;

a transparent data detection unit for detecting information on transparent data from the 16 byte parallel data;

four processing blocks for converting transparent data and operating an effective byte number, of the 16 byte parallel data, for every 4 byte parallel data, on the basis of the information on transparent data;

two first switches each of which moves effective data to one 4 byte parallel data from another 4 byte parallel data following the one 4 byte parallel data, to arrange 8 byte parallel data, on the information on transparent data and the effective byte number;

a second switch for moving effective data to one 8 byte parallel data from another 8 byte parallel data following the one 8 byte parallel data, to arrange 16 byte parallel data, on the information on transparent data and the effective byte number;

a pointer for determining addresses at which the 16 byte parallel data are rearranged, on the effective byte number; and a data array unit for moving effective data to one 16 byte parallel data from another 16 byte parallel data following the one 16 byte parallel data, to rearrange 16 byte parallel data filled with effective data, at the addresses, on the basis of effective byte number and the addresses.

12. A data processing method of data in a high-speed serial data communication, comprising the steps of:

converting high-speed serial data to 16 byte parallel data;

detecting information on transparent data from the 16 byte parallel data;

converting transparent data and operating an effective byte number, of the 16 byte parallel data, for every 4 byte parallel data, on the basis of the information on transparent data;

moving effective data to one 4 byte parallel data from another 4 byte parallel data following the one 4 byte parallel data, to arrange 8 byte parallel data, on the information on transparent data and the effective byte number;

moving effective data to one 8 byte parallel data from another 8 byte parallel data following the one 8 byte parallel data, to arrange 16 byte parallel data, on the information on transparent data and the effective byte number;

determining addresses at which the 16 byte parallel data are rearranged, on the effective byte number; and moving effective data to one 16 byte parallel data from another 16 byte parallel data following the one 16 byte parallel data, to rearrange 16 byte parallel data filled with effective data, at the addresses, on the basis of effective byte number and the addresses.

* * * * *